US010281047B2

(12) United States Patent
Scattini

(10) Patent No.: US 10,281,047 B2
(45) Date of Patent: May 7, 2019

(54) SEALING SYSTEM FOR INDUSTRIAL GATE VALVES AND GATE VALVE COMPRISING SUCH A SYSTEM

(75) Inventor: Roberto Scattini, Credaro (IT)

(73) Assignee: Gasket International S.P.A., Cividino di Castelli Calepio (IT)

( * ) Notice: Subject to any disclaimer, the term of this patent is extended or adjusted under 35 U.S.C. 154(b) by 0 days.

(21) Appl. No.: 14/111,474

(22) PCT Filed: Apr. 12, 2011

(86) PCT No.: PCT/EP2011/055700
§ 371 (c)(1),
(2), (4) Date: Oct. 11, 2013

(87) PCT Pub. No.: WO2012/139630
PCT Pub. Date: Oct. 18, 2012

(65) Prior Publication Data
US 2014/0034861 A1 Feb. 6, 2014

(51) Int. Cl.
*F16K 3/02* (2006.01)
(52) U.S. Cl.
CPC .............. *F16K 3/02* (2013.01); *F16K 3/0227* (2013.01)
(58) Field of Classification Search
CPC ................................. F16K 3/0227; F16K 3/02
USPC .......................................................... 251/328
See application file for complete search history.

(56) References Cited

U.S. PATENT DOCUMENTS

| 3,050,077 | A | * | 8/1962 | Wheatley | 137/312 |
| 3,293,342 | A | * | 12/1966 | Grove | 264/157 |
| 3,401,915 | A | * | 9/1968 | Kim | 251/174 |
| 3,765,647 | A | | 10/1973 | Grove et al. | |
| 4,062,516 | A | * | 12/1977 | Grove | 251/174 |
| 4,163,544 | A | * | 8/1979 | Fowler et al. | 251/328 |
| 4,603,864 | A | * | 8/1986 | Raftis | 277/643 |
| 5,090,661 | A | * | 2/1992 | Parks et al. | 251/172 |
| 5,163,655 | A | | 11/1992 | Chickering, III et al. | |

(Continued)

FOREIGN PATENT DOCUMENTS

| EP | 2078892 A1 | 7/2009 |
| EP | 2366920 A1 | 9/2011 |

(Continued)

OTHER PUBLICATIONS

International Search Report and Written Opinion for PCT/EP2011/055700, filed Apr. 12, 2011 (dated Dec. 22, 2011).

*Primary Examiner* — Marina A Tietjen
*Assistant Examiner* — Frederick D Soski
(74) *Attorney, Agent, or Firm* — Pepper Hamilton LLP

(57) ABSTRACT

The present invention concerns a sealing system particularly for industrial safety valves, even more particularly for industrial gate valves. Hence, the subject of the present invention is both a sealing system (1) suited to be used on a gate valve and a gate valve comprising such a sealing system (1). The system according to the present invention allows to combine the advantages in terms of simplicity and cost-effectiveness for manufacturing gate valves provided with a traditional sealing system, with further advantages in terms of performance both at high and at low operating pressures and reducing the torques required to handle the slab, also ensuring the operation of the valve itself with unaltered sealing performance over time, even under particular and demanding operating conditions.

12 Claims, 2 Drawing Sheets

(56) References Cited

U.S. PATENT DOCUMENTS

| | | | |
|---|---|---|---|
| 5,413,140 A * | 5/1995 | Kimpel et al. | 137/375 |
| 6,341,835 B1 * | 1/2002 | Ogawa et al. | 347/16 |
| 6,957,816 B2 * | 10/2005 | Blease et al. | 277/602 |
| 2007/0228316 A1 | 10/2007 | Tatum et al. | |

FOREIGN PATENT DOCUMENTS

| | | |
|---|---|---|
| RU | 2360169 C1 | 6/2009 |
| WO | 2006130546 A2 | 12/2006 |

* cited by examiner

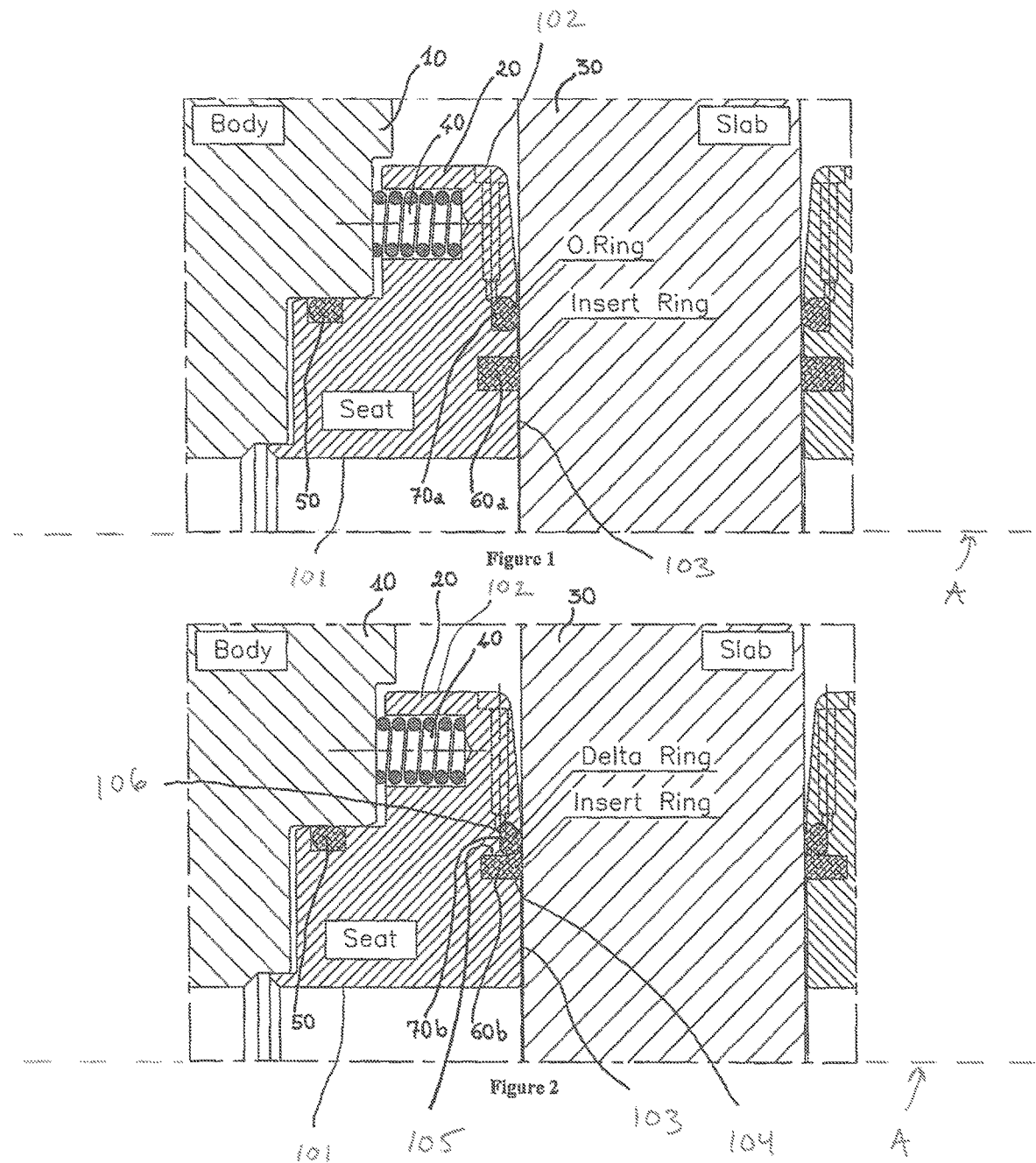

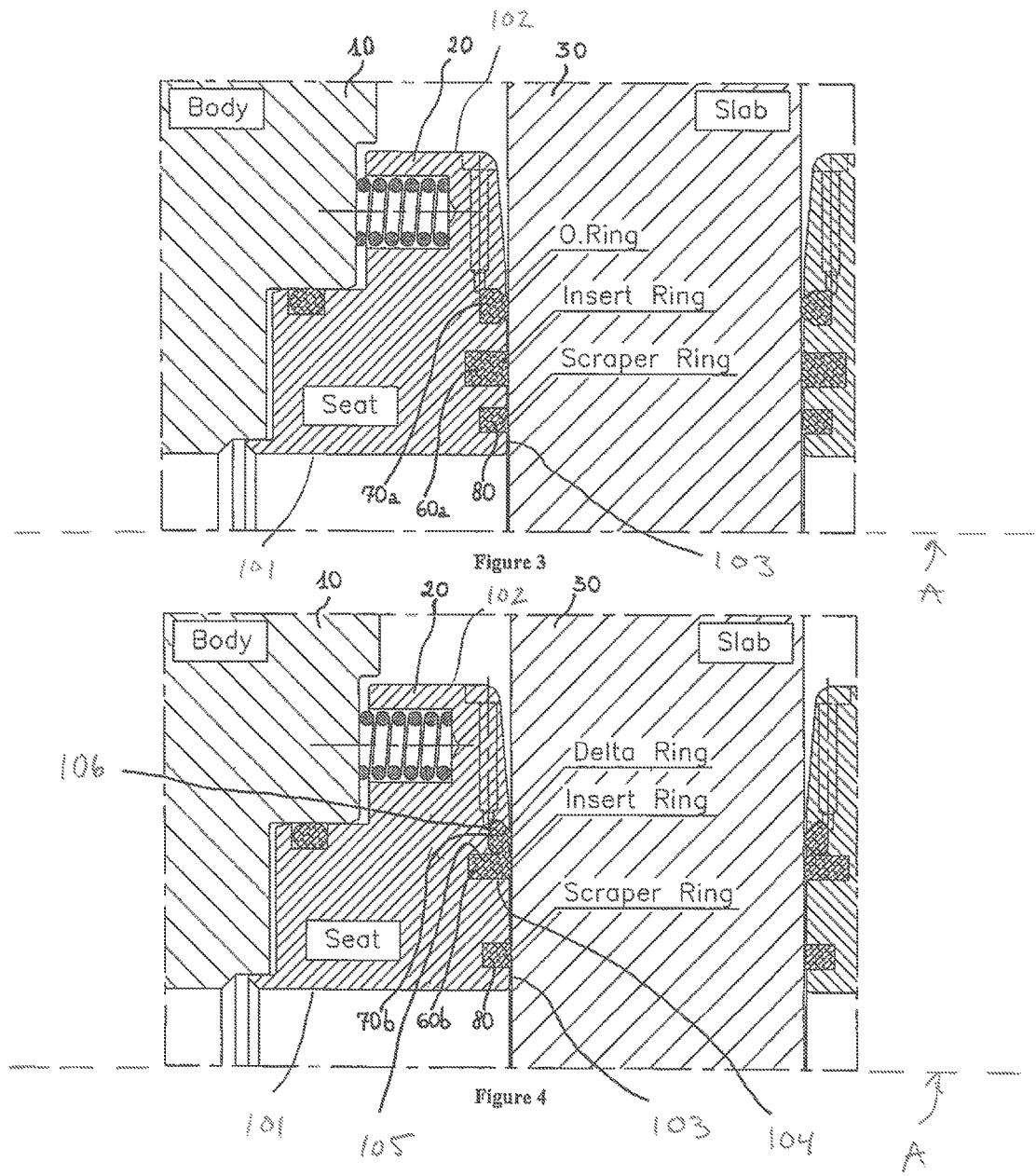

SEALING SYSTEM FOR INDUSTRIAL GATE VALVES AND GATE VALVE COMPRISING SUCH A SYSTEM

This application is a national stage application under 35 U.S.C. § 371 of PCT International Application No. PCT/EP2011/055700, filed Apr. 12, 2011, which is hereby incorporated by reference in its entirety.

The present invention concerns a sealing system particularly for industrial safety valves, even more particularly for industrial gate valves.

Safety valves, in particular gate valves, are complex systems comprising a plurality of components and are generally operable by means of a mechanical actuator.

Moreover, they generally comprise at least one main body, at least one seat or sealing seat, and at least one slab.

In certain types of gate valves known from the state of the art, the seat sealing on the slab is obtained by means of a metal-to-metal contact.

Nevertheless, this type of seal is not free from contraindications, mainly due to the metal-to-metal contact between the seat and the slab being able to cause the definitive seizing of the valve, often with irreparable damage, and this is due both to the high pressures that are discharged from the seat onto the slab, and due to the possible infiltration of debris or in any case dirt between the seat and the slab. In order to partially discharge the pressure which is exerted between the seat and the slab and in order to avoid the metal-to-metal seal which may lead to the valve seizing, as mentioned, gate valves are known on the market in which a member made of thermoplastic material works between the seat and the slab, which is suited to ensure the sealing of the valve while being suited to allow the relative movement between seat and slab, required to achieve the opening and closing of the valve itself.

As known from the state of the art, said sealing member generally consists of an insert made of thermoplastic material assembled to the metal part called sealing seat and suited to hermetically close the valve body and the slab, as mentioned. Although this type of gate valves provided with an insert made of thermoplastic material associated with the sealing seat is very widespread on the market, this technical solution does have some drawbacks.

Among these drawbacks, for example, there is the sealing not being optimal if exclusively left to the thermoplastic material assembled to the metal sealing seat. Indeed, to obtain a good sealing, the thermoplastic material should contact a slab characterized by a surface almost free from superficial roughness. For this reason the metal surface of the slab should be accurately machined, in particular it should be lapped, which involves a significant increase of the production costs.

The need to provide such a mechanical machining and control of tolerances in the step of manufacturing the parts, involves a significant increase of the production costs, thus making the valves provided with sealing members made of thermoplastic material much more costly, and thus exposing to the risk that manufacturing defects affect the good sealing of the valve itself.

Again, when the valve sealing is exclusively left to the presence of an insert made of thermoplastic material, this is subject to wear and deformations due to consequential misalignments between seat and slab, for example, to the valve opening and closing manoeuvres.

Not last, a drawback which afflicts the gate valves of known type provided with a sealing insert made of thermoplastic material consists in that they are not reliable due to high fluid pressure values, high pressures even intended as pressure values exceeding 55 bars. This due to the fact that the sealing achieved by the insert made of thermoplastic material is not optimal, especially as a consequence of the aforesaid wear.

Solutions are known on the market to improve the valve sealing even at higher fluid pressure values, which solutions include the metal seat itself as the main sealing member, possibly comprising a sealing member made of thermoplastic material directly suited to the slab. Examples of materials used are the PTFEs (with various compounds), nylon, PEEK, and similar thermoplastic polymers with high hardness.

Even if this solution is ameliorative in terms of sealing at high pressures, it is not totally satisfactory to counter the aforesaid drawbacks.

Moreover, the high manufacturing costs due to reasons such as hardening filling materials on the surface, both on the seat and on the slab, combined with exasperated machining of the surfaces, both of the seat and of the slab, created the conditions to research for new solutions.

Hence we have shown how the solutions known from the state of the art to manufacture the seat sealing on the slab in gate valves are affected by drawbacks limiting the utilization field thereof.

It is therefore the primary task of the present invention to provide a sealing system for industrial gate valves which solves the above-described problems left unsolved by the systems of known type.

Within the scope of this task, it is the object of the present invention to provide a sealing system capable of ensuring the sealing even for high operating pressures, exceeding 55 bars, up to 150 bars and beyond, while keeping the manufacturing costs low.

It is another object of the present invention to provide a sealing system which is free from the problems deriving from the presence of impurities or dirt in general in the fluid, which in the long term compromise the proper operation of the valve and the sealing of the seat on the sphere.

It is also the object of the present invention to provide a sealing system suited to the high pressures while keeping low costs for manufacturing the system itself and the valve comprising such a system.

Not last, it is the object of the present invention to provide a sealing system which, with respect to the seals at high pressures, ensures a decrease of the torque values necessary to open/close the valve, with the consequential advantage of being able to use less powerful actuators, thus resulting in further operating and manufacturing saving.

This task and these and other objects which will become more apparent upon a detailed description of the present invention given here by way of non-limiting illustration, are achieved by a sealing system for industrial gate valves of the type comprising at least one seat suited to be inserted in the containing body of a gate valve, and at least one sealing member made of elastomeric material suited to achieve the fluid sealing between said seat and the slab of said valve, characterized in that it also comprises at least a further rubber sealing member on the surface of said seat intended to face towards said slab.

Further features and advantages of the present invention will become more apparent from the following detailed description, given by way of non-limiting example and illustrated in the accompanying drawings, in which:

FIG. 1 shows a diagram of the system according to the present invention in a first configuration and according to a first embodiment;

FIG. 2 shows a diagram of the system according to the present invention according to the configuration in FIG. 1 in a second embodiment;

FIG. 3 shows a diagram of the system according to the present invention according to a second embodiment and in a first configuration;

FIG. 4 shows a diagram of the system according to the present invention according to the configuration in FIG. 3 in a second embodiment.

In particular, with reference to FIG. 1, the sealing system 1 according to the present invention comprises a seat 20 for the sealing on a slab 30 and suited to cooperate with a valve body 10. Seat 20 cooperates with the valve body 10 as known from the state of the art, therefore a helical spring 40 and an o-ring seal 50 may be advantageously provided between said seat 20 and said valve body 10, for example. Seat 20 includes an inner cylindrical surface 101 and an outer cylindrical surface 102 that extend about axis A, and a further surface 103 extending between the inner cylindrical surface 101 and the outer cylindrical surface 102.

The operation of the foregoing safety valves is known. The pressure exerted by the fluid acting on the external part of seat 20 pushes the seat itself against slab 30, while the operation of the sealing system thus provides that spring 40, acting between seat and valve body, ensures the sealing for low pressure values, and as the pressure increases, the fluid itself exerts an action of pressing the seat against the slab, which ensures the valve sealing.

As shown in FIG. 1, the sealing of the seat on the slab according to the present invention, is performed by a sealing member 60a, preferably annular in shape and made of thermoplastic material, also called thermoplastic insert, positioned on the seat and projecting towards the slab 30, and by a member made of elastomeric material 70a, preferably a rubber o-ring, also positioned in a specific housing obtained on the seat 20 and capable of carrying out the sealing on slab 30.

A second configuration of the present invention is shown in FIG. 2, where the elastomeric sealing member 70b consists of a delta ring, so called for the particular triangular profile of the cross section which recalls of the delta symbol, as precisely seen in FIG. 2.

In this second configuration, the sealing member or thermoplastic insert 60b is positioned beside the elastomeric sealing member (delta ring) 70b so that the two members have an edge of their cross section in reciprocal contact, as shown again in FIG. 2. Thereby, the housing which accommodates the members 60b and 70b may be characterized by a broader port, which particularly facilitates the insertion of the delta ring into its housing. Indeed, inserting the elastomeric member into the seat is not simple, and particular care and the use of specific machinery are required to insert the o-ring into the housing obtained on the seat, especially in the case of the first embodiment where an o-ring having a circular cross section is used as an elastomeric sealing member.

In this configuration, sealing member or thermoplastic insert 60b is positioned in a first recess extending into the further surface 103 of the seat 20 along a first direction parallel to the axis A. The first recess for housing thermoplastic insert 60b includes a first recess inner cylindrical surface 104 and a first recess outer cylindrical surface 105 that are coaxial with the inner cylindrical surface 101 of the seat 20. The thermoplastic insert 60b is in contact with the first recess inner cylindrical surface 104 and the first recess outer cylindrical surface 105 when embedded in the first recess.

Elastomeric sealing member 70b is positioned in a second recess extending into the seat 20 along the first direction. The second recess is located further from the inner cylindrical surface 101 of the seat 20 in a second direction perpendicular to the first direction (perpendicular to axis A) than the first recess. The second recess includes a limiting surface 106 extending parallel to the second direction (perpendicular to axis A). Elastomeric sealing member 70b is in contact with at least a portion of the thermoplastic sealing member 60b and the limiting surface 106 of the second recess when positioned in the seat 20.

The first recess and the second recess are joined together to provide a larger fourth recess with joined edges. The first recess inner cylindrical surface 104 and the first recess outer cylindrical surface 105 of the first recess extend along the first direction (parallel to axis A into the seat 20 away from the slab 30 beyond the limiting surface 106 of the second recess.

The second configuration shown is thus preferred in terms of constructional simplicity.

Again, according to a further embodiment of the present invention shown in FIG. 3, in addition to the sealing member 60a made of thermoplastic material and to the o-ring sealing member 70a made of elastomeric material, the insertion of a further member 80 on the seat may be provided, as long as it always projects towards the slab 30 which is also preferably designed as a ring made of thermoplastic material, called scraper ring and placed to protect and guard the sealing system disclosed heretofore.

In particular, the protection member (scraper ring) is also inserted on the seat 20, placed between seat 20 and slab 30, placed close to the central fluid passage conduit with respect to the sealing members 60a, 60b and 70a, 70b.

Thereby, the scraper ring member 80 simultaneously serves the function of preserving the sealing members 60a and 70a from any impurities present in the fluid and preventing the metal-to-metal contact between seat 20 and slab 30 in the case of particularly high pressures, hence contributing to reduce the pressure acting between seat 20 and slab 30, while contributing to the sealing function performed by thermoplastic insert 60a and elastomeric insert 70a.

The same considerations here reported with reference to the embodiment in FIG. 3 may be repeated with reference to the embodiment in FIG. 4, where the additional scraper ring member 80 is associated with the sealing member made of thermoplastic material 60b and with the sealing member 70b made of elastomeric material called delta ring due to the substantially triangular profile of its cross section.

It has thus been shown how the sealing system for industrial gate valves according to the present invention achieves the suggested object and purposes.

In particular, it has been disclosed how the system object of the present invention allows to obtain the optimal sealing even against high operating pressures which exceed the standard values obtainable with the valves provided with traditional sealing systems.

It is a further object achieved by the system according to the present invention the improvement of the reliability of the valves provided with said system. Indeed, it has been shown how the risk of damaging the slab or, at worst, the seizing of the valve itself are also avoided in the case of very high operating pressures and presence of dirt in the line.

Again, it is an object achieved by the system according to the present invention the suppression or at least a considerable reduction of the sticking phenomenon, i.e. the gluing of the seat on the slab in the case of long periods of no handling of the valve, and this due to the fact that the system under examination considerably reduces the stress between the seat and the slab under the pressure push, thus preventing the metal contact between these two members.

It is not a last object achieved by the system according to the present invention the capability of using less powerful actuators for handling the slab with respect to the valves of the type known from the state of the art and having the same utilization pressure range.

Again, it is an object achieved by the system according to the present invention the provision of a gate valve which is more cost-effective to be implemented, the operating pressures being the same.

Several modifications may be made by the person skilled in the art without departing from the scope of protection of the present invention.

Therefore, the scope of protection of the claims should not be limited by the disclosures or preferred embodiments shown in the description by way of example, but rather the claims should comprise all features of patentable novelty inferable from the present invention, including all features which would be treated as equivalents by the person skilled in the art.

The invention claimed is:

1. A sealing system for industrial valves, the sealing system comprising:
    a seat suited to be inserted into a containing body of a gate valve and a slab moveable with respect to the seat to hermetically close the gate valve, wherein the seat comprises an inner cylindrical surface and an outer cylindrical surface extending about an axis, and a further surface extending between the inner cylindrical surface and the outer cylindrical surface, wherein the further surface of the seat comprises:
        a first recess extending into the seat along a first direction parallel to the axis, the first recess comprising a first recess inner cylindrical surface and a first recess outer cylindrical surface that are coaxial with the inner cylindrical surface of the seat;
        a second recess extending into the seat along the first direction and located further from the inner cylindrical surface of the seat in a second direction perpendicular to the first direction than the first recess, wherein the second recess comprises a limiting surface extending parallel to the second direction and wherein the first recess and the second recess are joined together to provide a larger fourth recess with joined edges, wherein the first recess inner cylindrical surface and the first recess outer cylindrical surface of the first recess extend along the first direction into the seat away from the slab beyond the limiting surface of the second recess; and
        a third recess located independently from the first recess and the second recess;
        a thermoplastic sealing member embedded in the first recess of the seat and protruding beyond the surface of the seat toward the slab, wherein the thermoplastic sealing member has a polygonal cross-section when inserted in the first recess wherein the thermoplastic member is in contact with the first recess inner cylindrical surface and the first recess outer cylindrical surface when embedded in the first recess;
        an elastomeric sealing member embedded in the second recess of the seat and protruding beyond the surface of the seat toward the slab, wherein the second elastomeric member is in contact with at least a portion of the thermoplastic sealing member and the limiting surface of the second recess, wherein the elastomeric sealing member has a triangular cross-section, wherein the thermoplastic sealing member and the elastomeric sealing member are configured to provide a fluid seal between the seat and the slab; and
        a thermoplastic ring member inserted in the third recess of the seat and protruding beyond the surface of the seat toward the slab.

2. The sealing system according to claim 1, wherein the elastomeric sealing member is ring-shaped.

3. The sealing system according to claim 2, wherein the thermoplastic ring member is proximal to a central fluid passage conduit with respect to the thermoplastic sealing member and the elastomeric sealing member.

4. The gate valve according to claim 1, wherein the thermoplastic ring member is proximal to a central fluid passage conduit with respect to the thermoplastic sealing member and the elastomeric sealing member.

5. The sealing system according to claim 1, wherein the first recess is polygonal in shape.

6. The sealing system according to claim 1, wherein the second recess comprises a first inner surface that extends substantially parallel to the surface of the seat and a second inner surface that extends substantially linearly at an acute angle from the first inner surface to the surface of the seat.

7. The sealing system according to claim 1, wherein the thermoplastic sealing member has an edge member located near the surface of the seat when the thermoplastic sealing member is inserted into the first recess, wherein the edge member extends into the second recess to contain the elastomeric sealing member within the second recess.

8. An gate valve comprising:
    a containing body;
    a seat suited to be inserted into the containing body of the gate valve and a slab moveable with respect to the seat to hermetically close the gate valve, wherein the seat comprises an inner cylindrical surface and an outer cylindrical surface extending about an axis, and a further surface extending between the inner cylindrical surface and the outer cylindrical surface, wherein the further surface of the seat comprises:
        a first recess extending into the seat along a first direction parallel to the axis, the first recess comprising a first recess inner cylindrical surface and a first recess outer cylindrical surface that are coaxial with the inner cylindrical surface of the seat;
        a second recess extending into the seat along the first direction and located further from the inner cylindrical surface of the seat in a second direction perpendicular to the first direction than the first recess, wherein the second recess comprises a limiting surface extending parallel to the second direction and wherein the first recess and the second recess are joined together to provide a larger fourth recess with joined edges, wherein the first recess inner cylindrical surface and the first recess outer cylindrical surface of the first recess extend along the first direction into the seat away from the slab beyond the limiting surface of the second recess; and
        a third recess located independently from the first recess and the second recess;
    a thermoplastic sealing member embedded in the first recess of the seat and protruding beyond the surface of the seat toward the slab, wherein the thermoplastic sealing member has a polygonal cross-section when inserted in the first recess wherein the thermoplastic member is in contact with the first recess inner cylindrical surface and the first recess outer cylindrical surface when embedded in the first recess;

an elastomeric sealing member embedded in the second recess of the seat and protruding beyond the surface of the seat toward the slab, wherein the second elastomeric member is in contact with at least a portion of the thermoplastic sealing member and the limiting surface of the second recess, wherein the elastomeric sealing member has a triangular cross-section, wherein the thermoplastic sealing member and the elastomeric sealing member are configured to provide a fluid seal between the seat and the slab; and a thermoplastic ring member inserted in the third recess of the seat and protruding beyond the surface of the seat toward the slab.

9. The gate valve according to claim 8, wherein the elastomeric sealing member is ring-shaped.

10. The gate valve according to claim 8, wherein the first recess is polygonal in shape.

11. The gate valve according to claim 8, wherein the second recess comprises a first inner surface that extends substantially parallel to the surface of the seat and a second inner surface that extends substantially linearly at an acute angle from the first inner surface to the surface of the seat.

12. The gate valve according to claim 8, wherein the thermoplastic sealing member has an edge member located near the surface of the seat when the thermoplastic sealing member is inserted into the first recess, wherein the edge member extends into the second recess to contain the elastomeric sealing member within the second recess.

* * * * *